United States Patent [19]

Manganaro et al.

[11] Patent Number: 6,047,276
[45] Date of Patent: Apr. 4, 2000

[54] CELLULAR NEURAL NETWORK TO IMPLEMENT THE UNFOLDED CHUA'S CIRCUIT

[75] Inventors: Gabriele Manganaro, Catania; Mario Lavorgna, Bacoli; Matteo Lo Presti, Misterbianco; Luigi Fortuna, Siracusa, all of Italy

[73] Assignees: SGS-Thomson Microelectronics S.r.l., Agrate Brianza; Consorzio per la Ricerca sulla Microelettronica nel Mezzogiorno, Catania, both of Italy

[21] Appl. No.: 08/825,546

[22] Filed: Mar. 19, 1997

[30] Foreign Application Priority Data

Mar. 21, 1996 [EP] European Pat. Off. .............. 96830137

[51] Int. Cl.$^7$ ...................................................... G06E 1/00
[52] U.S. Cl. .................................. 706/17; 706/38; 395/26
[58] Field of Search .............................. 395/26; 364/807; 706/38, 17

[56] References Cited

U.S. PATENT DOCUMENTS

| 5,093,803 | 3/1992 | Howard et al. .......................... 364/807 |
| 5,355,528 | 10/1994 | Roska et al. ............................... 706/38 |

FOREIGN PATENT DOCUMENTS

| WO-A-94 09441 | 4/1994 | WIPO ............................. G06F 15/18 |

OTHER PUBLICATIONS

European Search Report from European Patent Application 96830137.4, filed Mar. 21, 1996.

Electronics Letters, vol. 31, No. 21, Oct. 12, 1995, pp 1794/1795, Arena P. et al., "Simplified Scheme For Realisation of Chua Oscillator by Using SC–CNN Cells".

IEEE Transactions on Circuits and Systems I: Fundamental Theory and Applications, vol. 42, No. 2, Feb. 1, 1995, pp 122–125, Arena P. et al., "Chua's Circuit can be Generated by CNN Cells".

Arena, P. Baglio, S., Fortuna, L., and Manganaro, G.:"Chua's circuit can be generated by CNN cells", IEEE Trans., 1995, CAS–I–42, pp. 123–125, Feb. 1, 1995.

Arena, P. Baglio, S., Fortuna, L., and Manganaro, G.: "Hyperchaos from cellular neural networks," Electron. Lett., 1995, 31, pp. 250–251, Feb. 16, 1996.

Arena, P. Baglio, S., Fortuna, L., and Manganaro, G.: "Simplified scheme for realization of Chua oscillator by using SC–CNN cells", Electron. Lett., 1995, 31, pp. 1794–1795, Oct. 1, 1995.

Arena, P. Baglio, S., Fortuna, L., and Manganaro, G.: "Experimental signal transmission using synchronized state controlled cellular networks", Electron. Lett., 1995, 32, pp. 362–363, Feb. 15, 1996.

Lu, H., Yang, L., Wang, B., He, Z.: "A new type of chaotic attractor with cellular neural networks", Circuits and Systems, 1995 IEEE International Symposium, 1995, 2, pp. 997–1000, Jan. 1, 1995.

Zou, F. and Nossek, J.: "Double scroll and cellular neural networks", Circuits and systems, 1992 IEEE International Symposium, 1992, 1, pp. 320–323, Jan. 1, 1992.

Manganaro et al., "Simplified Scheme for Realization of Chua Oscillator by using SC–CNN Cells", Electronics Letters, vol. 31, No. 21, Oct. 12, 1995.

Caponetto, R. et al., "Cellular Neural Networks in Secure Transmission Applications", CNNA '96: Fourth IEEE International Workshop on Cellular Neural Networks and their Applications, Seville, Spain, Jun. 24–26, 1996.

(List continued on next page.)

Primary Examiner—Tariq R. Hafiz
Assistant Examiner—Wilbert L. Starks, Jr.
Attorney, Agent, or Firm—Wolf, Greenfield & Sacks, P.C.; James H. Morris; Theodore E. Galanthay

[57] ABSTRACT

A neural cellular network for implementing a so-called Chua's circuit, and comprising at least first, second and third cells having respective first and second input terminals and respective state terminals, the first and second input terminals being to receive a first and a second reference signal, respectively, and the first cell, and the second and third cells being of mutually different types.

33 Claims, 4 Drawing Sheets

OTHER PUBLICATIONS

Arena et al., "Hyperchaos from Cellular Neural Networks", Electronics Letters, vol. 31, No. 4, Feb. 16, 1995.

Sanchez–Sinencio, Edgar, "Operational Transconductance Amplifier–Based Nonlinear Function Syntheses", IEEE Journal of Solid–State Circuits, vol. 24, No. 6, Dec. 1989.

CELLULAR NEURAL NETWORK TO IMPLEMENT THE UNFOLDED CHUA'S CIRCUIT

BACKGROUND OF THE INVENTION

1. Field of the Invention

The invention relates to a network of the neural cellular type useful to implement a so-called Chua's circuit. More particularly, the invention relates to a cellular neural network of the type that includes at least first, second and third cells, each having respective first and second input terminals and respective state terminals, wherein the first and second input terminals are to receive first and second reference signals, respectively.

The invention concerns in particular, though not exclusively, a cellular neural network adapted to implement a Chua's circuit of the so-called unfolded type, and this description will make reference to that field of application for simplicity of illustration.

2. Discussion of the Related Art

Cellular neural networks are a new class of non-linear analog circuits developed by Chua and Yang in 1988.

As those skilled in the art know well, Chua's circuit is an oscillatory circuit which exhibits a large variety of fork and chaos phenomena.

Figure 1:
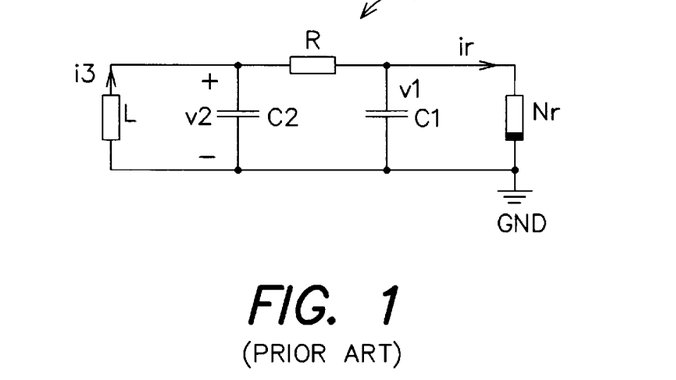
FIG. 1 shows diagrammatically a conventional type of Chua's circuit.

Shown diagrammatically in FIG. 1 is an exemplary Chua's circuit, generally designated 1, which comprises first C1, second C2 and third L linear energy-storage elements. These elements are connected, in parallel with one another, across an additional non-linear element Nr which is further connected to a potential reference, such as a signal ground GND.

In particular, the additional non-linear element Nr is a non-linear resistor commonly referred to as "Chua's diode".

Furthermore, each of the first C1 and second C2 linear elements has a first terminal connected to the ground GND, and a second terminal connected together through a linear element R, specifically a resistor.

The equations of state for the circuit 1 are the following:

$$C_1 \frac{dv_1}{dt} = G(v_2 - v_1) - g(v_1) \quad (1.1)$$

$$C_2 \frac{dv_2}{dt} = G(v_1 - v_2) + i_3 \quad (1.2)$$

$$L \frac{di_3}{dt} = -v_2 \quad (1.3)$$

where, $v_1$ and $v_2$ are a first and a second voltage value appearing across the first C1 and second C2 linear elements, respectively;

$i_3$ is the value of a current flowing through the third linear element L;

G is the conductance of the linear element R, i.e., $G=1/R$; and $g(v_1)$ is a segmental linear function described by the following relation:

$$g(v_1) = G_b v_1 + \frac{1}{2}(G_a - G_b)[|v_1 + B_p| - |v_1 - B_p|] \quad (1.4)$$

in which, $G_a$ and $G_b$ are a first and a second slope of the function curve; and $B_p$ is a point of inflection on the function curve.

Figure 2:
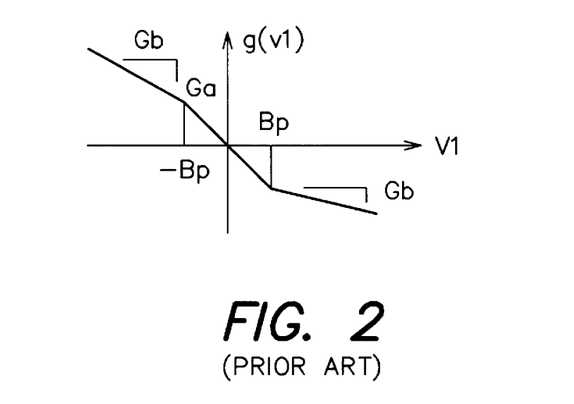
FIG. 2 is a graph schematically illustrating the behavior of a variable relating to the circuit of FIG. 1.

Shown in FIG. 2 is a possible plot of the function $g(v_1)$ versus voltage $v_1$. It can be seen from this plot that the additional non-linear element Nr is a voltage-controlled element, since the current flowing therethrough is a function of the voltage applied to its terminals.

A solution of the equations of state (1.1), (1.2), (1.3) above has been simulated to show that Chua's circuit 1 has an attractor DS, known as a double-scroll attractor. In addition, a variety of forks and chaotic attractors can be obtained. The circuit 1 can be regarded as a basic element of chaotic systems.

It would also be possible to introduce a further linear element $R_0$, in series with the third linear element L. The resulting circuit is referred to as an "unfolded" Chua's circuit, and is described by the following equations of state:

$$C_1 \frac{dv_1}{dt} = G(v_2 - v_1) - f(v_1) \quad (2.1)$$

$$C_2 \frac{dv_2}{dt} = G(v_1 - v_2) + i_3 \quad (2.2)$$

$$L \frac{di_3}{dt} = -(v_2 + R_0 i_3) \quad (2.3)$$

where, $f(v_1)$ is a segmental linear function described by the following relation:

$$f(v_1) = G_b v_1 + \frac{1}{2}(G_a - G_b)[|v_1 + B_p| - |v_1 - B_p|] \quad (2.4)$$

The equations of state (2.1), (2.2), (2.3) of the unfolded Chua's circuit can also be written in the following dimensionless forms:

$$\dot{x} = \alpha[-h(x)] \quad (3.1)$$

$$\dot{y} = x - y + z \quad (3.2)$$

$$\dot{z} = -\beta y - \gamma z \quad (3.3)$$

with:

$$h(x) = m_1 x + 0.5(m_0 - m_1)[|x+1| - |x-1|] \quad (3.4)$$

where, x, y, z are the state variables of the dimensionless equations system (3.1), (3.2), (3.3), (3.4); and $\alpha$, $\beta$, $\gamma$, $m_0$, $m_1$ are the parameters of the dimensionless equations system.

By a simple calculation process, the following relations can be found for the parameters involved:

| | | | |
|---|---|---|---|
| $x = v_1/E$ | $y = v_2/E$ | $z = i_3/(EG)$ | (4.1) |
| $t = (\tau G)/C_2$ | $m_0 = (G_a/G) + 1$ | $m_1 = (G_b/G) + 1$ | (4.2) |
| $\alpha = C_2/C_1$ | $\beta = C_2/(LG^2)$ | $\gamma = (C_2/R_0)/(GL)$ | (4.3) |

Chua's circuit 1 is formed, specifically in its unfolded configuration, in a known manner from cells of Cellular Neural Networks (CNNs), as described in an article, "Chua's Circuit Can Be Generated by CNN Cells" by Arena, Baglio, Fortuna and Manganaro, published in IEEE TRANSACTIONS ON CIRCUITS AND SYSTEMS—PART I, Feb. 2, 1995, which is hereby incorporated by reference.

Figure 3:
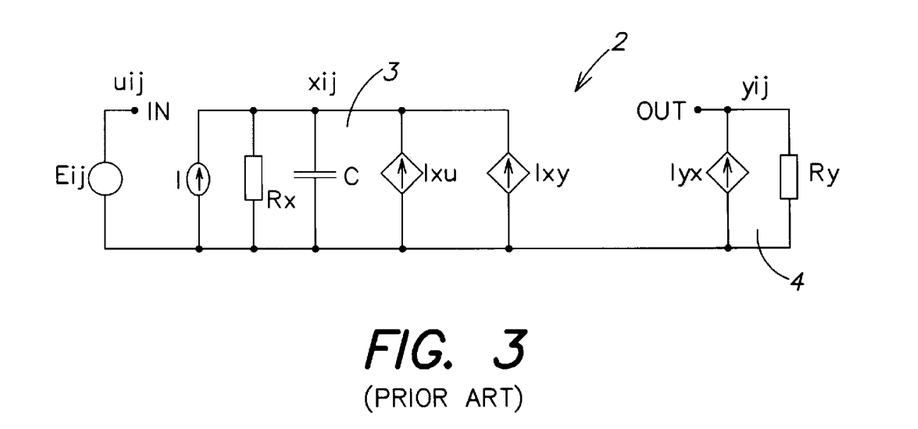
FIG. 3 shows diagrammatically a basic cell of conventional cellular neural networks.

Cellular neural networks are a new class of non-linear analog circuits introduced in 1988 by Chua and Yang. FIG. 3 is a typical diagram for a basic cell 2 in cellular neural networks or CNNs.

This basic cell 2 has an input voltage generator Eij connected to an input terminal IN which is to receive an input signal $u_{ij}$.

Also provided is a first divider 3 which has a bias current generator I, a resistive element Rx, a capacitive element C, and first Ixu and second Ixy current generators which are voltage-controlled in parallel with each other. The basic cell 2 further includes a second divider 4 having a third voltage-controlled current generator Iyx in parallel with a resistive element Ry, and an output terminal OUT of the basic cell 2.

The output terminal OUT supplies an output voltage $y_{ij}$, and a voltage corresponding to a state variable $x_{ij}$ of the cell 2 is present on the first divider 3. The output signal $y_{ij}$ is tied to the state variable $x_{ij}$ by the following non-linear equation:

$$y_{ij}=0.5[|x_{ij}+1|-|x_{ij}-1|] \tag{5}$$

A cellular neural network or CNN includes a plurality of basic cells 2 interconnected with adjacent cells, the latter forming the cell "neighborhood".

Figure 4:
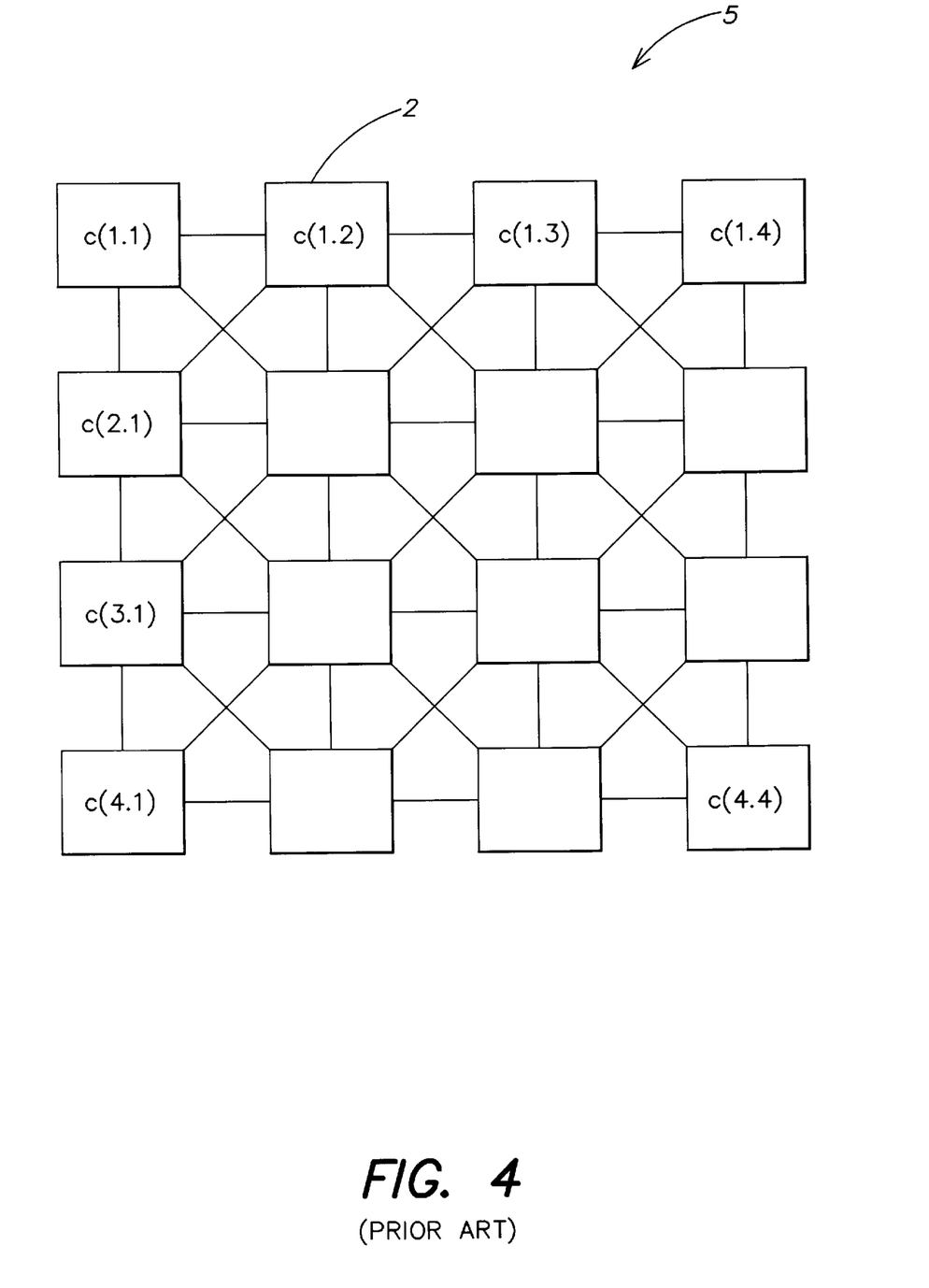
FIG. 4 illustrates, in schematic form, the layout of a cellular neural network formed of cells as shown in FIG. 3.

A simple implementation of a CNN includes a bi-dimensional array of M×N identical cells. An array 5 of this kind is shown in FIG. 4, where the nomenclature C(i,j) indicates a cell located in the i-th row and j-th column of the array 5, with i varying between 1 and N, and j varying between 1 and M.

Each cell C(i,j) interacts with its neighbors through voltage-controlled current generators, as described by the following relations:

$$I_{xy}(i,j;k,l)=A(i,j;k,l)y_{kl} \tag{6.1}$$

$$I_{xu}(i,j;k,l)=B(i,j;k,l)u_{kl} \tag{6.2}$$

$$C(k,l)\in N_r(i,j) \tag{6.3}$$

where,

A(ij;k,l) and B(ij;k,l) are constant coefficients commonly referred to as "cloning templates"; and $N_r$ is the neighborhood of the cell C(k,l) as described by the following relation:

$$N_r(i,j)=\{C(k,l)|\max(|k-i|,|l-j|)\leq r, 1\leq k\leq M; 1\leq l\leq N\} \tag{6.4}$$

From the previous equations of state (6.1), (6.2) and (6.3), applicable to a single cell C(k,l), a relation can be obtained which applies to all the cells in a cellular neural network (CNN). Thus the following equation of state is arrived at:

$$Cx_{ij}(t) = -\frac{1}{R_x}x_{ij}(t) + \sum_{C(k,l)\in N_r(i,j)} A(i,j;k,l)y_{kl}(t) + \sum_{C(k,l)\in N_r(i,j)} B(i,j;k,l)u_{kl}(t) + I \tag{7}$$

Therefore, a cellular neural network (CNN) is an n-dimensional array of dynamic systems, called the cells, which satisfy two conditions. First, most of the interactions are local and have a finite radius.

Second, all the state variables are signals which vary continuously.

A basic cell in a cellular neural network (CNN) can be modelled as described by the following non-linear equation of state:

$$\dot{x}_j=-x_j+a_jy_j+G_0+G_s+i_j \tag{8}$$

where, j is the cell index;

$x_j$ is the state variable;

$a_j$ is a constant parameter;

$i_j$ is a threshold value;

$G_0$ and $G_s$ are linear combinations of the outputs and the state variables of cells connected to the cell considered; and $y_j$ is the cell output as per the following relation:

$$y_j=0.5[|x_j+1|-|x_j-1|] \tag{9}$$

In the simplified instance of three cells being connected, the model of the dynamic system represented by the equation of state (7) becomes, $$\dot{x}_1 = -x_1 + a_1y_1 + a_{12}y_2 + a_{13}y_3 + \sum_{k=l}^{3} s_{1k}x_k + i_l \tag{10.1}$$

$$\dot{x}_2 = -x_2 + a_{21}y_1 + a_2y_2 + a_{23}y_3 + \sum_{k=l}^{3} s_{2k}x_k + i_2 \tag{10.2}$$

$$\dot{x}_3 = -x_3 + a_{31}y_1 + a_{32}y_2 + a_3y_3 + \sum_{k=l}^{3} s_{3k}x_k + i_3 \tag{10.3}$$

where, $x_1$, $x_2$, $x_3$ are the state variables of the system; and $y_1$, $y_2$, $y_3$ are the corresponding outputs.

By arranging for the parameters $a_{ij}$ and $s_{ij}$ of the system to satisfy the following relations, $$a_{12}=a_{13}=a_2=a_{23}=a_3=a_{21}=a_{31}=0 \tag{11.1}$$

$$s_{13}=s_{31}=s_{22}=0 \tag{11.2}$$

$$i_1=i_2=i_3=0 \tag{11.1}$$

the system model can be simplified to the following form:

$$\dot{x}_1=-x_1+a_1y_1+s_{11}x_1+s_{12}x_2 \tag{12.1}$$

$$\dot{x}_2=-x_2+s_{21}x_1+s_{23}x_3 \tag{12.2}$$

$$\dot{x}_3=-x_3+s_{32}x_2+s_{33}x_3 \tag{12.3}$$

The equations system (12.1), (12.2) and (12.3) correspond to the linear equations system (2.1), (2.2) and (2.3) which model an unfolded Chua's circuit.

Therefore, it can be concluded that an unfolded Chua's circuit can be implemented by a circuit using a CNN made up of three basic cells.

Figure 5:
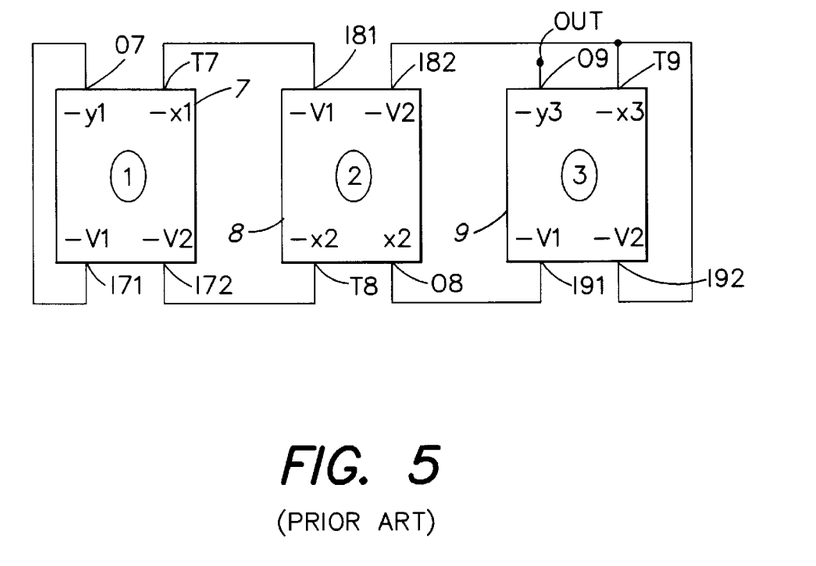
FIG. 5 illustrates schematically a cellular neural network of a conventional type.

Shown diagrammatically in FIG. 5 is a cellular neural network 6 which includes first 7, second 8 and third 9 basic cells.

Each of the basic cells 7, 8, 9 has a pair of input terminals, an output terminal and a state terminal. In particular, the first basic cell 7 has a first input terminal I71 connected to an output terminal O7, a second input terminal I72 connected to a state terminal T8 of the second basic cell 8, and a state terminal T7 connected to a first input terminal I81 of the second basic cell 8.

The second basic cell 8 has an output terminal O8 and a second input terminal I82 which are respectively connected to first I91 and second I92 input terminals of the third basic cell 9.

Furthermore, the third basic cell 9 has a state terminal T9 connected to the first input terminal I92, and an output terminal O9 which forms an output terminal OUT of the network 6.

Present on the terminals of the basic cells 7, 8, 9 are the following signals:

I71 opposite of a first reference signal V1;
I72 opposite of a second reference signal V2;
O7 opposite of a first output signal y1;
T7 opposite of a first state signal x1;
I81 opposite of the first reference signal V1;
I82 opposite of the second reference signal V2;
O8 a second state signal x2;
T8 opposite of the second state signal x2;
I91 opposite of the first reference signal V1;
I92 opposite of the second reference signal V2;
O9 opposite of an output signal y3;
T9 opposite of a third state signal x3.

Figure 6:
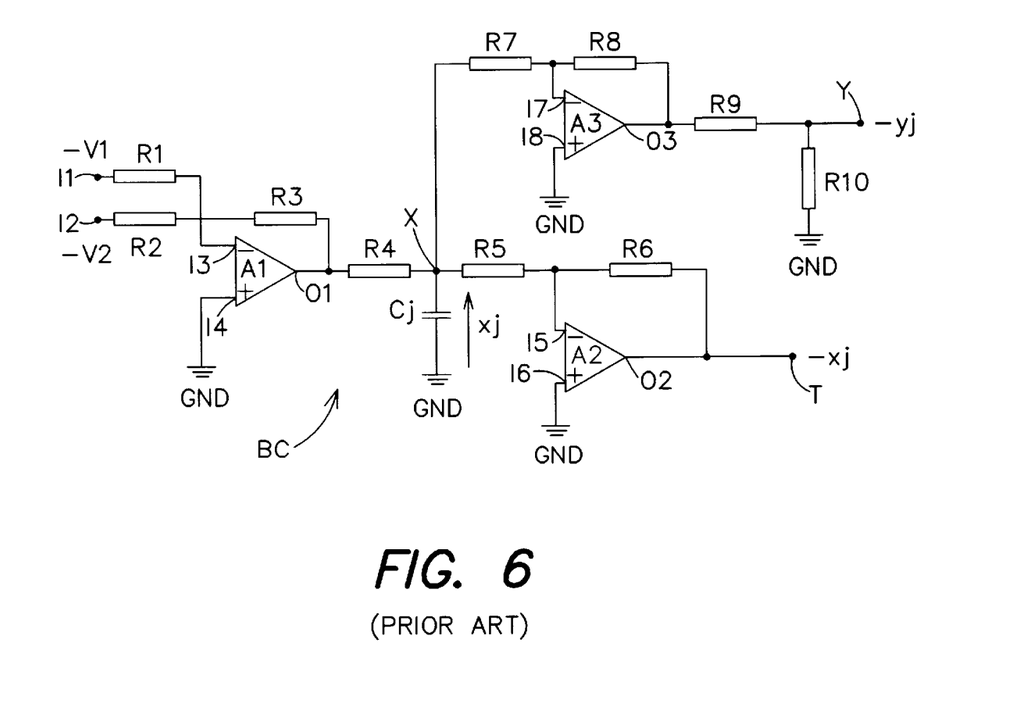
FIG. 6 shows one possible embodiment of a basic cell in the network of FIG. 5.

Each basic cell 7, 8, 9 can be implemented by a circuit according to the diagram shown in FIG. 6, which illustrates a generic basic cell BC.

The cell BC has first I1 and second I2 input terminals which receive the opposite of first V1 and second V2 reference signals, respectively.

The first input terminal I1 is connected, through a first linear element R1, which may be a resistor, to a first inverting input terminal I3 of a first operational amplifier A1 which has a second non-inverting input terminal I4 connected to a potential reference, such as a ground reference GND, and an output terminal O1 connected to the second input terminal I2 through a series of a second R2 and third R3 linear elements, e.g. resistors.

The output terminal O1 of the first operational amplifier A1 is further connected to an internal circuit node X through a fourth linear element R4.

This internal circuit node X is further connected to the ground reference GND, through a linear element Cj, such as a capacitor, and to a first inverting input terminal I5 of a second operational amplifier A2 through a fifth linear element R5.

The voltage present across the linear element Cj forms a state signal $x_j$ of the basic cell BC.

The second operational amplifier A2 has a second non-inverting input terminal I6 connected to the ground reference GND, and an output terminal O2 connected to the aforesaid first inverting input terminal I5 through a sixth linear element R6.

The output terminal O2 of the second operational amplifier A2 forms a state terminal T of the basic cell BC. The opposite of the state signal $x_j$ is present on the state terminal T.

Finally, the internal circuit node X is connected to a first inverting input terminal I7 of a third operational amplifier A3 through a seventh linear element R7, e.g. a resistor.

The third operational amplifier A3 has a second non-inverting input terminal I8 connected to the ground reference GND, and an output terminal O3 connected to the first input terminal through an eighth linear element R8, e.g. a resistor.

The output terminal O3 of the third operational amplifier A3 is connected to an output terminal Y of the basic cell BC through a ninth linear element R9, e.g. a resistor.

The output terminal Y of the basic cell BC is further connected to ground reference the GND through a tenth linear element R10, e.g. a resistor.

The opposite of an output signal $y_j$ is present on the output terminal Y of the basic cell BC.

The underlying technical problem of this invention is to provide a programmable cellular neural network which has such constructional and functional features as to represent an improvement on similar prior networks.

SUMMARY OF THE INVENTION

According to the invention a cellular neural network is provided, which includes a plurality of cells with programmable parameters, the cells coming in at least a first and a second cell type.

An embodiment of the invention is directed to a cellular neural network for implementing a so-called Chua's circuit. The cellular neural network includes a first cell, a second cell coupled to the first cell, and a third cell coupled to the second cell. Each cell includes a first input terminal to receive a respective first reference signal, a second input terminal to receive a respective second reference signal, and a state terminal. One of the cells is of a first type and the other cells are of a second type. The first type and the second type are different.

The features and advantages of a network according to the invention will be apparent from the following detailed description of an embodiment thereof, given by way of non-limitative example with reference to the accompanying drawings.

DETAILED DESCRIPTION

Figure 7:
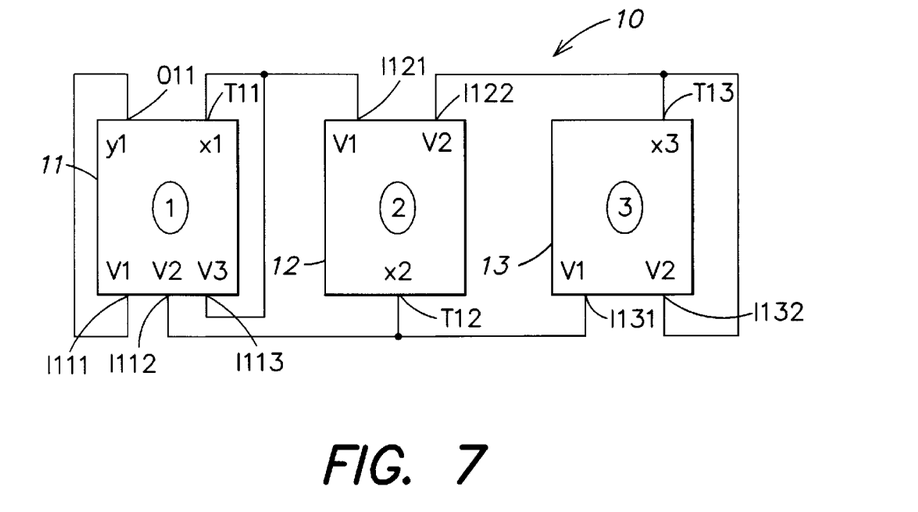
FIG. 7 illustrates schematically a cellular neural network according to the invention.

An embodiment of the invention is directed to a cellular neural network 10 which is illustrated in FIG. 7.

The network 10 includes a first basic cell 11 of a first type, and second 12 and third 13 basic cells of a second type.

In particular, the first basic cell 11 has first I111, second I112 and third I113 input terminals, as well as an output terminal O11 and a state terminal T11.

The first input terminal I111 is connected to the output terminal O11, and the third input terminal I113 is connected to the state terminal T11 and to a first input terminal I121 of the second basic cell 12.

The second input terminal I112 of the first basic cell 11 is connected to a state terminal T12 of the second basic cell 12 and to a first input terminal I131 of the third basic cell 13.

Furthermore, the third basic cell 13 has a second input terminal I132 connected to a state terminal T13 and to a second input terminal I122 of the second basic cell 12.

Present on the terminals of the basic cells 11, 12, 13 are signals as listed here below:

I111 a first reference signal V1;
I112 a second reference signal V2;
I113 a third reference signal V3;
O11 a first output signal y1;
T11 a first state signal x1;
I121 the first reference signal V1;
I122 the second reference signal V2;
T12 a second state signal x2;
I131 the first reference signal V1;
I132 the second reference signal V2;
T13 a third state signal x3.

Figure 8:
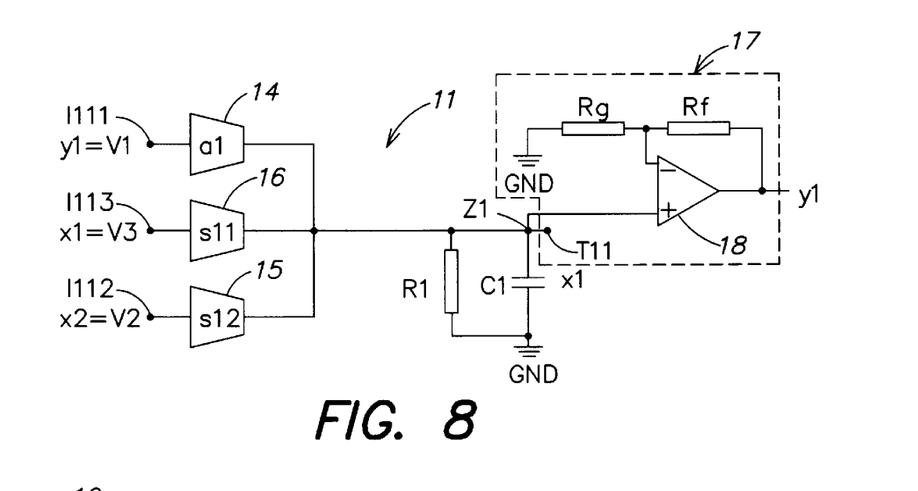
FIG. 8 shows an embodiment of a first-type of basic cell that can be used in the network of FIG. 7 according to the invention.

The basic cell 11 of the first type can be implemented as illustrated by the diagram of FIG. 8 and described here below.

The basic cell 11 includes first 14, second 15 and third 16 amplifying stages, specifically transconductance amplifiers of the OTA (Operational Transconductance Amplifier) type, respectively connected between the first I111, second I112 and third I113 input terminals, and an internal circuit node Z1.

The first 14, second 15 and third 16 amplifying stages have variable gains, in particular variable transconductances.

The internal circuit node Z1 forms the state terminal T11, and is connected to a potential reference, in particular a ground reference GND, through a linear element R1, in particular a resistor, and a further linear element C1, such as a capacitor, in parallel with the element R1.

The voltage across the linear element C1 represents a state signal xl of the basic cell 11.

In addition, the internal circuit node Z1 is connected to the output terminal O11 through a non-inverting stage 17.

The non-inverting stage 17 includes an amplifier 18, specifically an operational amplifier, which has a non-inverting (+) input terminal connected to the internal circuit node Z1 and an inverting (−) input terminal connected to an output terminal through a first linear element Rf, and to the ground potential reference GND through a second linear element Rg. In one embodiment, Rf and Rg are resistors.

Figure 9:
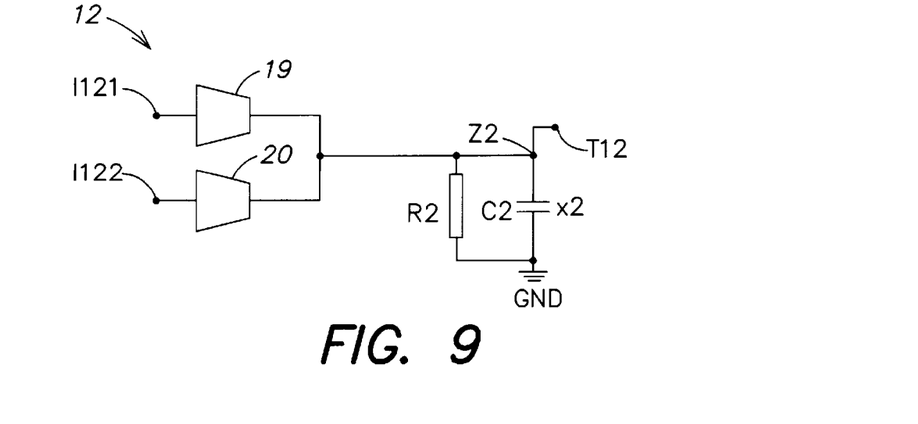
FIG. 9 shows an embodiment of a second-type of basic cell that can be used in the network of FIG. 7 according to the invention.

Shown schematically in FIG. 9 is an embodiment of the basic cell 12 which is similar to the basic cell 13, but of the second type.

The basic cell 12 includes first 19 and second 20 amplifying stages, again transconductance amplifiers of the OTA type, which are respectively connected between the first I121 and second I122 input terminals, and an internal circuit node Z2.

The internal circuit node Z2 forms the state terminal T12 and is connected to a potential reference, specifically a ground reference GND, through a linear element R2, in particular a resistor, and a further linear element C2, such as a capacitor, the linear elements R2 and C2 being connected in parallel with each other.

The voltage present across the linear element C2 represents a state signal x2 of the basic cell 12.

In one embodiment, the cell 13 is also of the second type. The cells 12 and 13 of the second type have, therefore, a simpler construction and need no non-linear amplifying stage on their outputs to arrange for a non-linear output therefrom.

The operation of the network 10 according to the invention will now be described.

The network 10 can be modelled by equations system of state, which can be written in the following simplified dimensionless forms:

where, $$\dot{x}_1 = -x_1 + a_1 y_1 + s_{11} x_1 + s_{12} x_2 \quad (12.1)$$

$$\dot{x}_2 = -x_2 + s_{21} x_1 + s_{23} x_3 \quad (12.2)$$

$$\dot{x}_3 = -x_3 + s_{32} x_2 + s_{33} x_3 \quad (12.3)$$

$x_1$, $x_2$, $x_3$ are the state variables of the equations;
$y_1$ is the output; and
$a_j$, $s_{ij}$ are the program parameters of the network 10 as modelled by the equations system (13.1), (13.2) and (13.3).

The equations system (13.1), (13.2) and (13.3) correspond to the non-linear equations system (2.1), (2.2) and (2.3) that modelled the unfolded Chua's circuit. Advantageously, using this invention, the parameters of the network 10 can be programmed by changing the gains of the input amplifying stages of the cells 11, 12 and 13.

In fact, each transconductance amplifying stage of the OTA type is input an input voltage, V1, V2 and V3, respectively, and outputs a current value which is proportional to the voltage value at one gain, in particular coincident with the transconductance value of that stage. Such transconductances form the parameters of the cells 11, 12 and 13.

The use of transconductance amplifying stages of the OTA type is uniquely advantageous in that their gains, viz. their transconductances, can be varied simply by varying certain specific control currents. Thus, full programmability of the cell is achieved in a simple manner.

These control currents may be obtained, for example, by means of digital memories and special digital/analog converters, or alternatively, by means of analog memories, or the like arrangements.

In particular, the output currents from the amplifying stages 14, 15 and 16 of the cell 11, being respectively equal to $a_1 y_1$, $s_{11} x_1$ and $s_{12} x_2$, are added together by the connection to the common node Z1, and supplied to a circuit including the linear element R1 and the additional linear element C1.

The voltage across the linear element C1 is the state signal $x_1$ of the cell 11. This signal drives the output of the non-inverting amplifying stage 17.

The gain of this non-inverting amplifying stage 17 is suitably selected to have the output O11 of the stage 17 saturated when $x_1 < 1$ and $x_1 > -1$.

The third input terminal I113, connected to the state terminal T11 of the first cell 11, is needed in order to impress a value on the parameter so which is tied to the parameters α and $m_1$ of the equations system of state (3.1), (3.2) and (3.3) describing an unfolded Chua's circuit.

In addition, it should be noted that the internal generation of the parameters of all the cells 11, 12 and 13 will admit either positive or negative values for such parameters.

To summarize, the network 10 of this invention affords an implementation of Chua's circuit whereby the values of the parameters of cells with non-linear output, as well as cells with linear output, can be programmed.

Having thus described at least one illustrative embodiment of the invention, various alterations, modifications, and improvements will readily occur to those skilled in the art. Such alterations, modifications, and improvements are intended to be within the spirit and scope of the invention. Accordingly, the foregoing description is by way of example only and is not intended as limiting. The invention is limited only as defined in the following claims and the equivalents thereto.

What is claimed is:

1. A cellular neural network for implementing a so-called Chua's circuit, the cellular neural network comprising:
   a first cell;
   a second cell coupled to the first cell; and
   a third cell coupled to the second cell, wherein each cell includes a first input terminal to receive a respective first reference signal, a second input terminal to receive a respective second reference signal, and a state terminal, wherein one of the cells is of a first type and the other cells are of a second type, wherein the first type and the second type are different;
   wherein at least one of the cells includes an internal node and an amplifier stage connected between one of the input terminals and the internal node, wherein the amplifier stage has dynamically programmable gain.

2. The cellular neural network of claim 1, wherein the first cell is the one of the cells of the first type, and wherein the second cell and the third cell are the other cells of the second type.

3. The cellular neural network of claim 2, wherein the second cell and the third cell are of a linear type and have dynamically programmable parameters.

4. The cellular neural network of claim 2, wherein the first cell is of a non-linear type and has dynamically programmable parameters.

5. The cellular neural network of claim 4, wherein the first cell further includes a non-linear output terminal.

6. The cellular neural network of claim 5, wherein the non-linear output terminal of the first cell is connected to the first input terminal of the first cell; wherein the second input terminal of the first cell is connected to the state terminal of the second cell, and the first input terminal of the third cell; wherein the state terminal of the first cell is connected to the first input terminal of the second cell; wherein the second input terminal of the second cell is connected to the state terminal of the third cell, and the second input terminal of the third cell.

7. The cellular neural network of claim 6, wherein the first cell further includes a third input terminal, an internal circuit node, and a third amplifying stage connected between the third input terminal and the internal circuit node.

8. The cellular neural network of claim 7, wherein the third amplifying stage includes a transconductance amplifying stage of the Operational Transconductance Amplifier type.

9. The cellular neural network of claim 5, wherein the first cell further includes a third input terminal to receive a third reference signal.

10. The cellular neural network of claim 9, wherein the third input terminal of the first cell is connected to the state terminal of the first cell.

11. The cellular neural network of claim 5, wherein the first cell further includes a non-inverting amplifying stage, and wherein the state terminal of the first cell is connected to the non-linear output terminal through the non-inverting amplifying stage.

12. The cellular neural network of claim 11, wherein the non-inverting amplifying stage of said first cell includes:
   an amplifier having a first non-inverting input terminal connected to the internal circuit node;
   a first linear element;
   a second linear element; and
   a second inverting input terminal connected to the output terminal through the first linear element and to the potential reference through the second linear element.

13. The cellular neural network of claim 12, wherein the amplifier of the non-inverting amplifying stage of the first cell further includes an output, and wherein the amplifier of the non-inverting amplifying stage of the first cell is an operational amplifier having a gain such that the output is saturated when the first non-inverting input terminal of the amplifier is applied a signal that is greater than 1 or less than −1.

14. A cellular neural network for implementing a so-called Chua's circuit, the cellular neural network comprising:
   a first cell;
   a second cell coupled to the first cell; and
   a third cell coupled to the second cell, wherein each cell includes a first input terminal to receive a respective first reference signal a second input terminal to receive a respective second reference signal, and a state terminal wherein one of the cells is of a first type and the other cells are of a second type, wherein the first type and the second type are different;
   wherein the first cell is the one of the cells of the first type, and wherein the second cell and the third cell are the other cells of the second type; and
   wherein each of the first cell, the second cell, and the third cell includes:
      an internal circuit node;
      a first amplifying stage connected between the cell's first input terminal and the internal circuit node;
      a second amplifying stage connected between the cell's second input terminal and the internal circuit node;
      a first linear element connected between the internal circuit node and a potential reference; and
      a second linear element connected between the internal circuit node and the potential reference, wherein the first and second linear elements are connected in parallel with each other.

15. The cellular neural network of claim 14, wherein the internal circuit node of each cell is connected to the state terminal of that cell.

16. The cellular neural network of claim 14, wherein the first and second amplifying stages of each cell are transconductance amplifying stages of the Operational Transconductance Amplifier type.

17. A cellular neural network for implementing a so-called Chua's circuit, the cellular neural network comprising:
   a first cell;
   a second cell; and
   a third cell, wherein each cell includes a first input terminal, a second input terminal, and a state terminal, wherein one of the cells further includes a third input terminal, wherein at least one of the terminals of the first cell is connected to at least one of the terminals of the second cell, wherein at least one of the terminals of the second cell is connected to at least one of the terminals of the third cell, and wherein at least one of the input terminals of the cell that includes the third input terminal is connected to the state terminal of the cell that includes the third input terminal.

18. The cellular neural network of claim 17, wherein at least one of the terminals of the first cell is connected to at least one of the terminals of the third cell.

19. The cellular neural network of claim 17, wherein each cell further includes a plurality of operational transconductance amplifiers, each operational transconductance amplifier between connected between a respective input terminal of the cell and the state terminal of the cell.

20. The cellular neural network of claim 17,
wherein one of the first and second input terminals of the first cell is connected to the state terminal of the second cell, wherein the first cell is the one of the cells that further includes the third input terminal, and wherein the third input terminal of the first cell is connected to one of the first and second input terminals of the second cell.

21. A cell for a cellular neural network, comprising:
a first input terminal to receive a first reference signal;
a second input terminal to receive a second reference signal;
a state terminal to provide a state signal of the cell; and
a third input terminal to receive the state signal of the cell.

22. The cell of claim 21, wherein the cell is of a non-linear type.

23. The cell of claim 22, wherein the cell has dynamically programmable parameters.

24. The cell of claim 23, wherein the cell further comprises a first amplifier component with dynamically programmable gain connected between at least one of the input terminals and the state terminal.

25. The cell of claim 24, wherein the amplifier component includes an operational transconductance amplifier.

26. The cell of claim 24, wherein the first amplifier component is connected to the first input terminal, the cell further comprising:
a second amplifier component with dynamically programmable gain connected between the second input terminal and the state terminal; and
a third amplifier component with dynamically programmable gain connected between the third input terminal and the state terminal.

27. The cell of claim 26, further comprising:
a first linear element connected between the state terminal and a potential reference; and
a second linear element connected between the state terminal and the potential reference;
wherein the first and second linear elements are connected in parallel with each other.

28. The cell of claim 21, wherein the cell further comprises:
an output terminal to provide an output signal; and
a non-linear component to receive the state signal of the cell and to produce the output signal for the output terminal.

29. The cell of claim 28, wherein the non-linear component includes a non-inverting amplifier.

30. The cell of claim 29, wherein the non-inverting amplifier includes:
a first non-inverting input terminal connected to the state terminal node;
a first linear element;
a second linear element; and
a second inverting input terminal connected to the output terminal through the first linear element and to the potential reference through the second linear element.

31. The cell of claim 28, wherein one of the first and second input signals receives is the output signal.

32. The cell of claim 21, wherein the cellular neural network includes at least two other cells, and wherein two of the at least two other cells are interconnected to the cell to implement a so-called Chua's circuit.

33. The cellular neural network of claim 17, wherein a state signal of the cell that includes the third input terminal is present on the state terminal of the cell that includes the third input terminal such that the third input terminal is operative to receive the state signal.

* * * * *